June 23, 1964
H. B. HINDIN ETAL
3,138,510
TIRE SHAPING MACHINE
Filed March 28, 1961
10 Sheets-Sheet 8
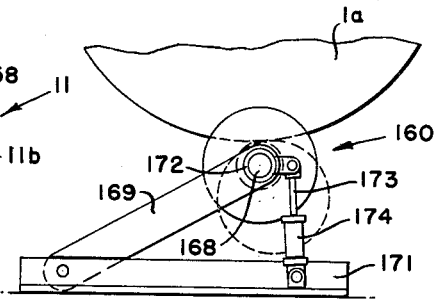
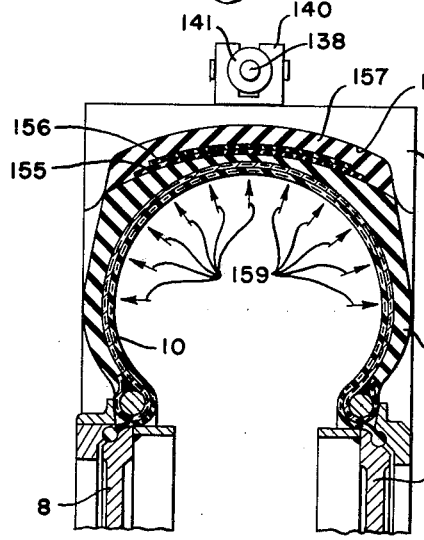
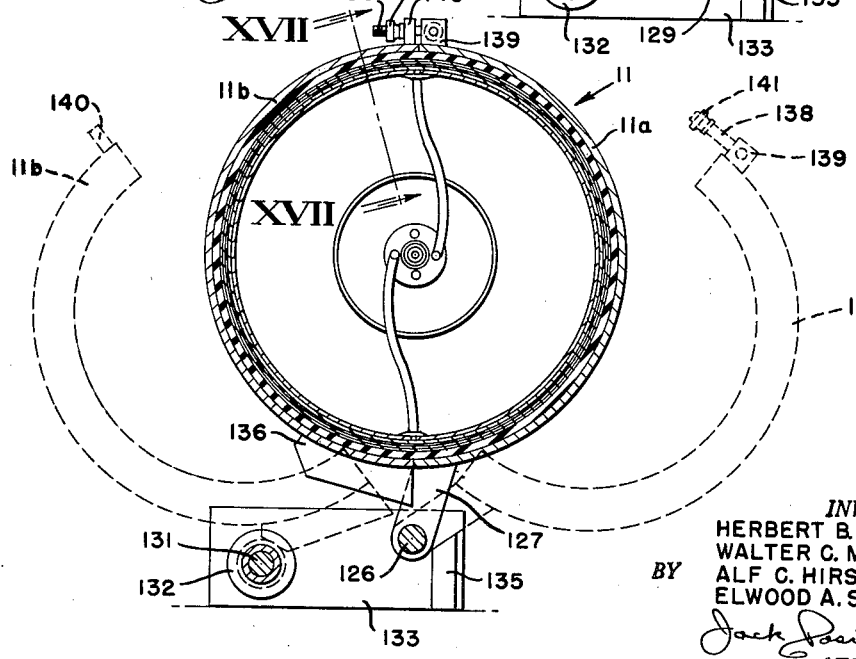
*INVENTOR.*
HERBERT B. HINDIN
WALTER C. MACKLEM
ALF C. HIRSCH
ELWOOD A. STIEGLER
BY
ATTORNEY

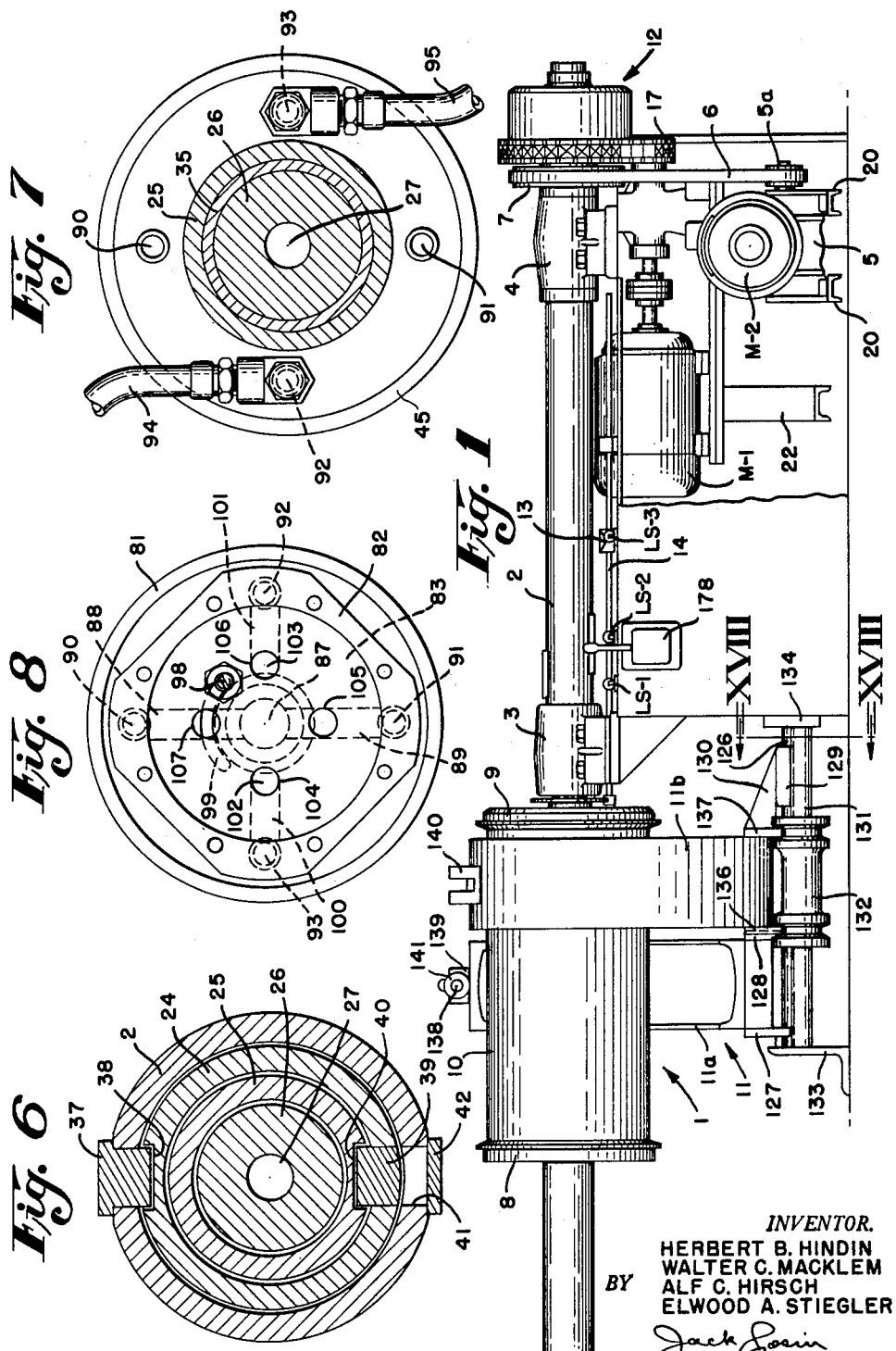

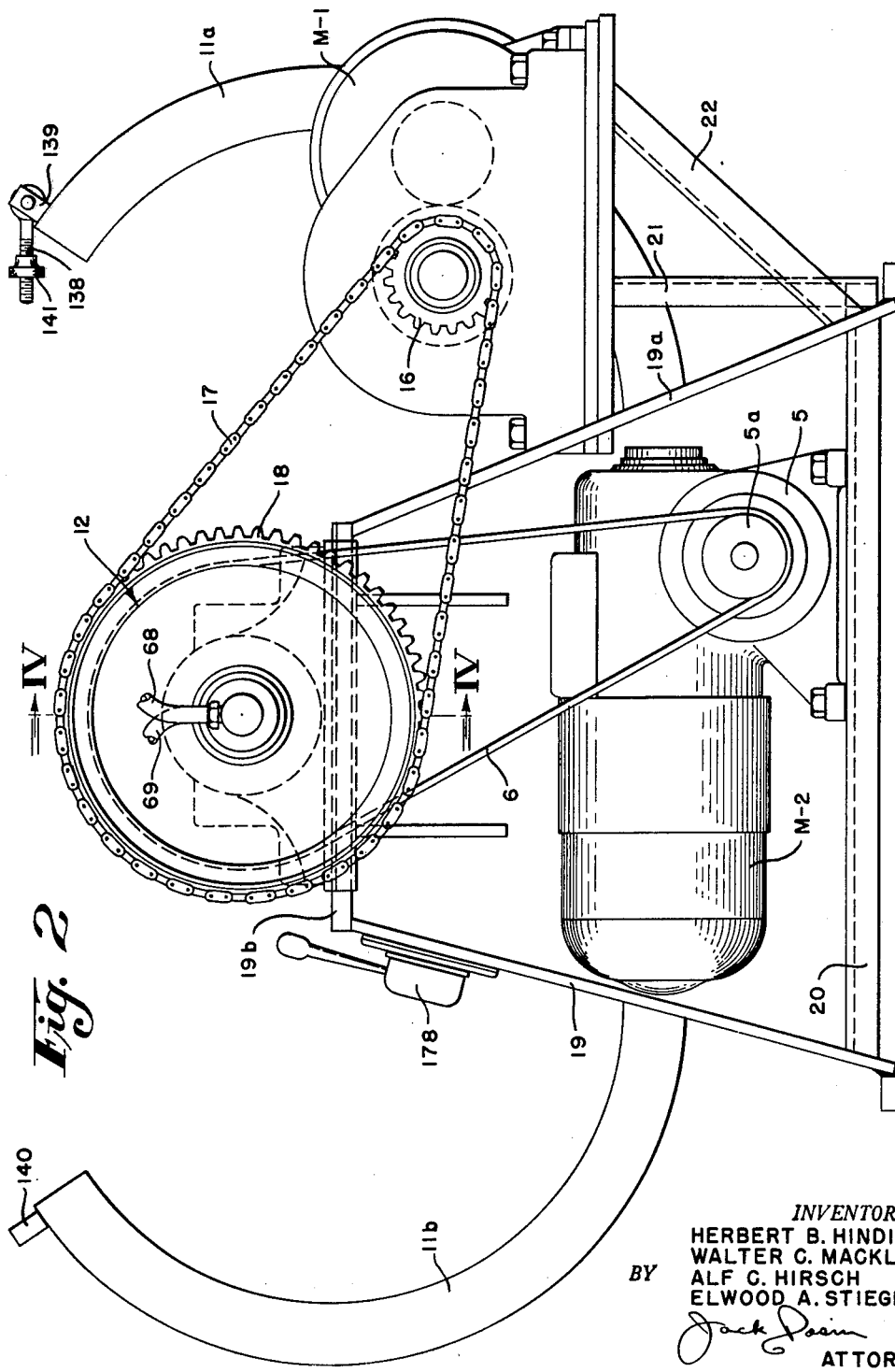

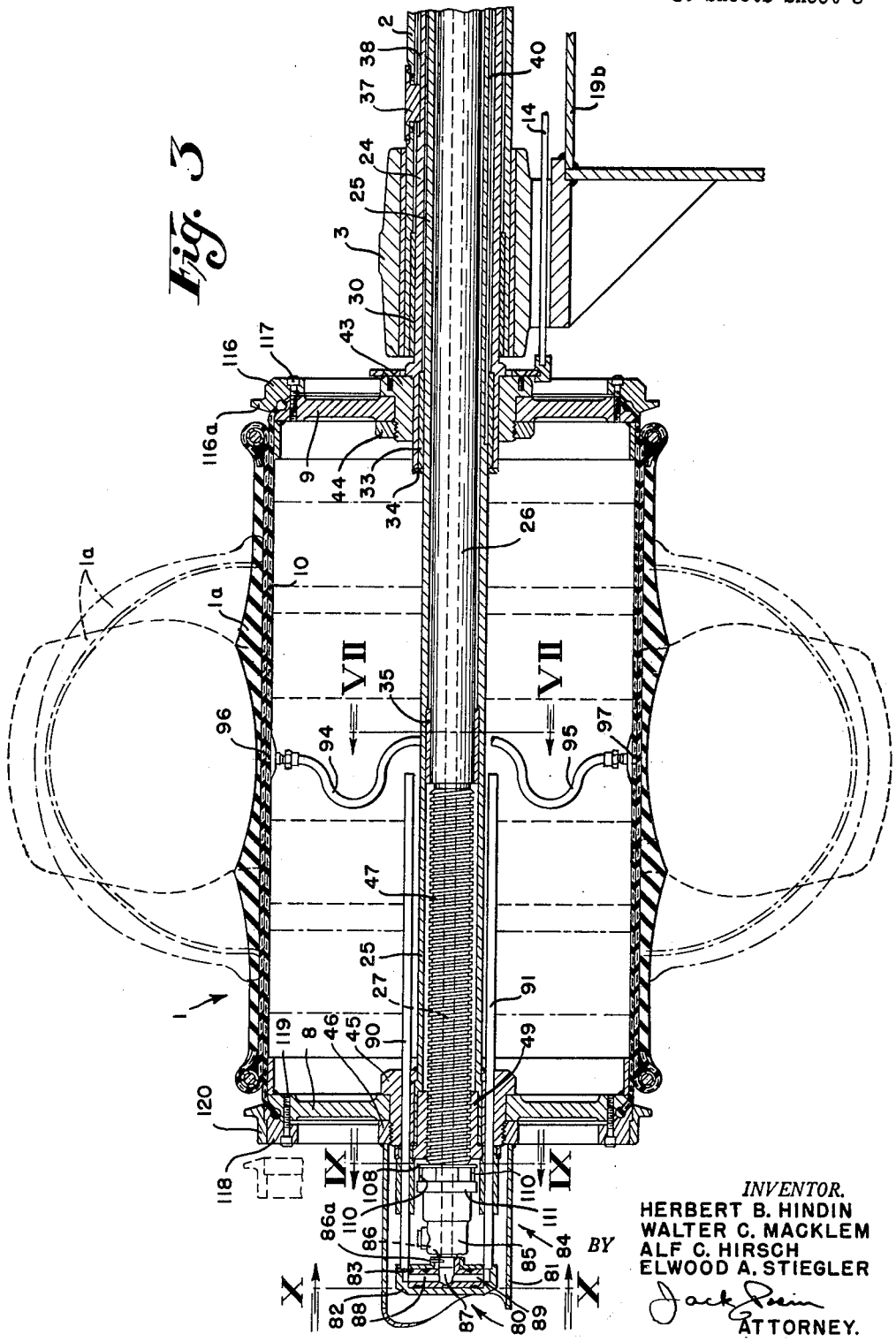

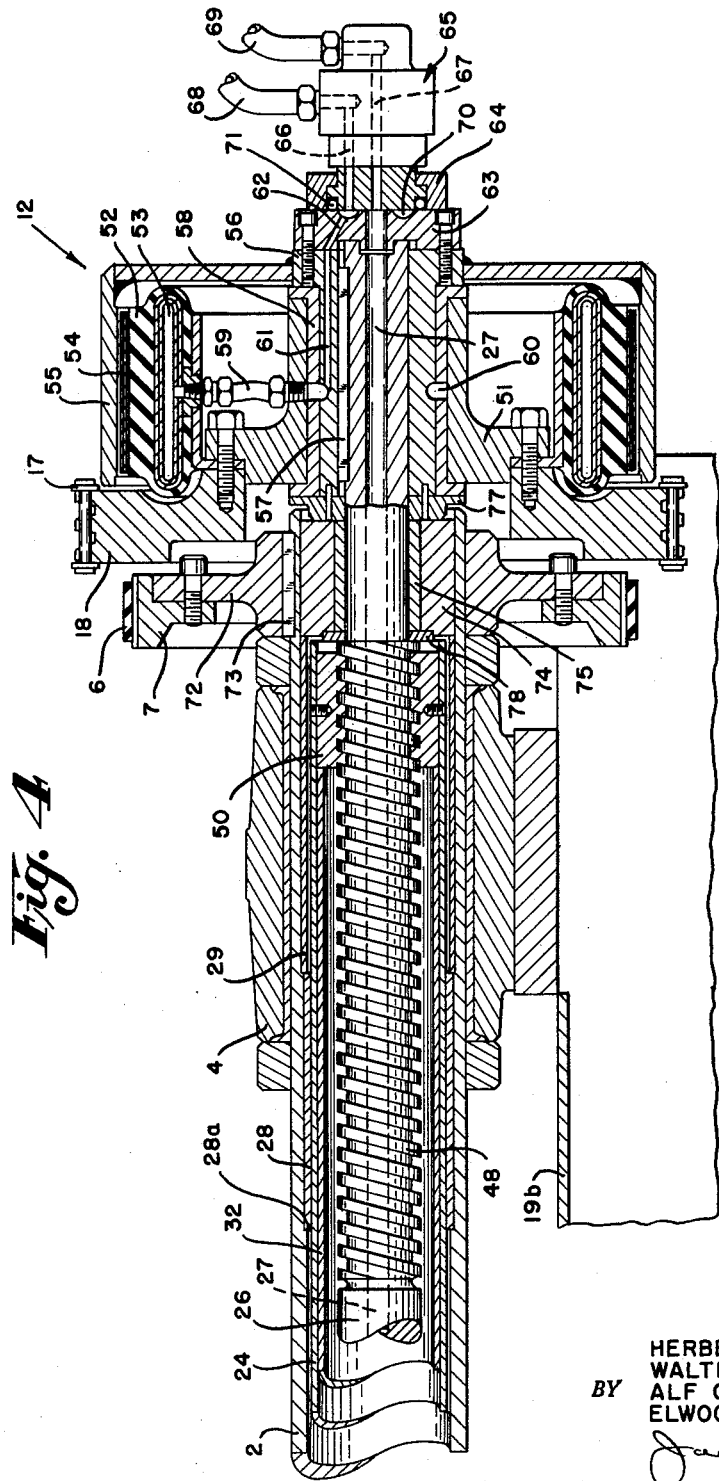

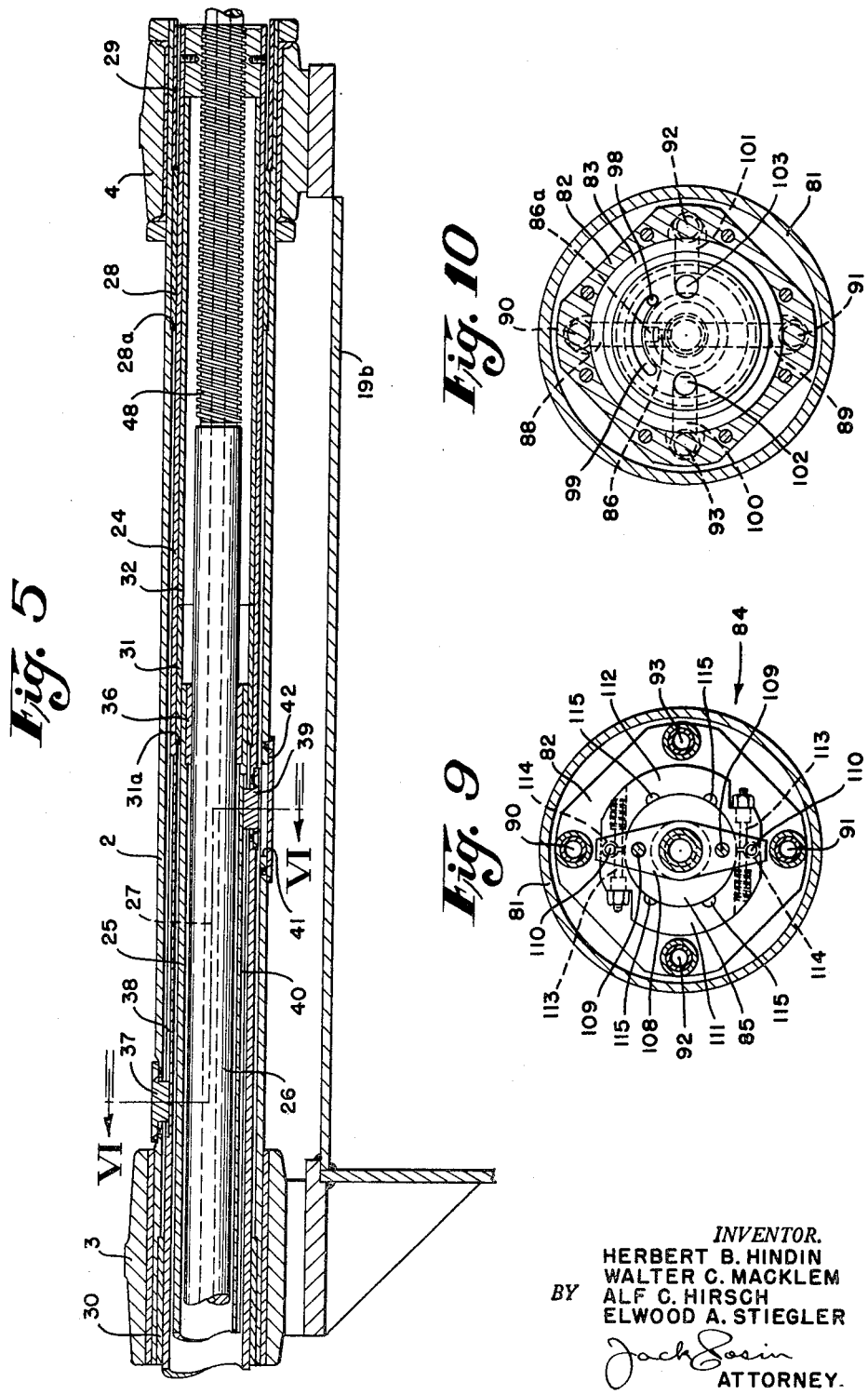

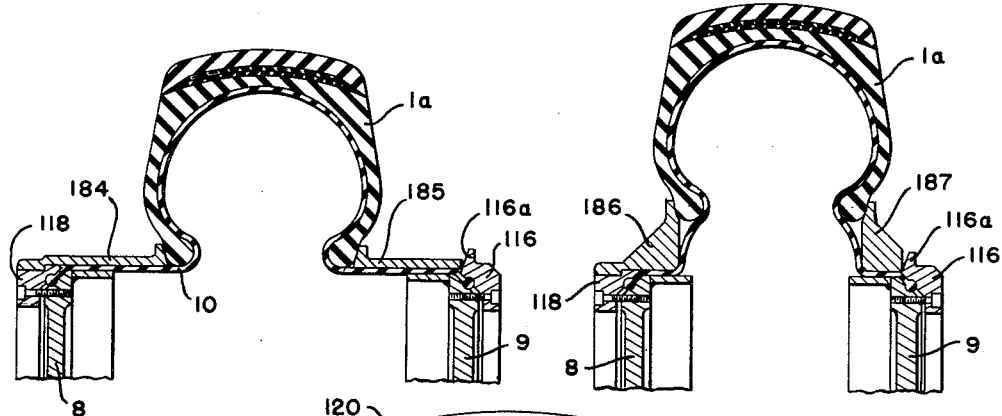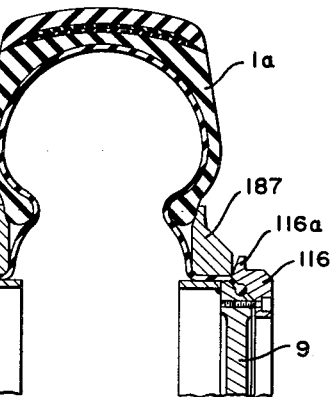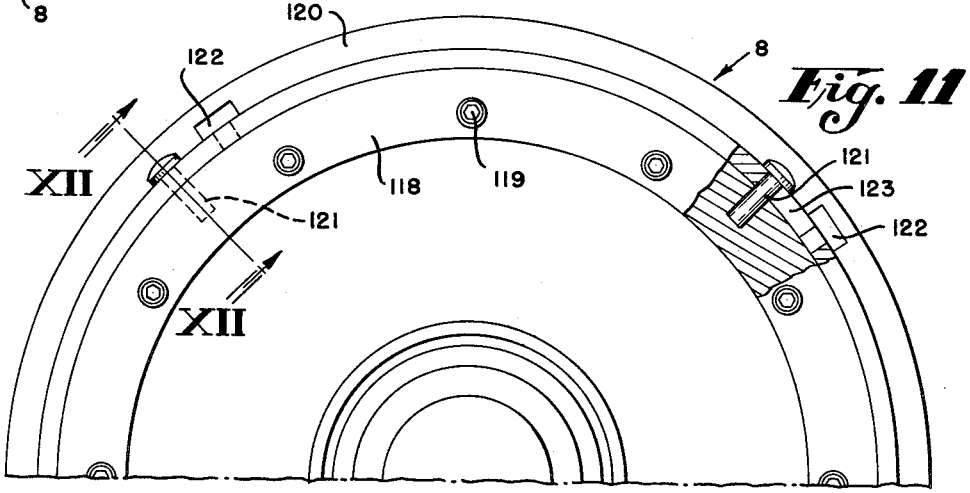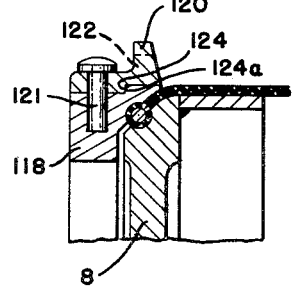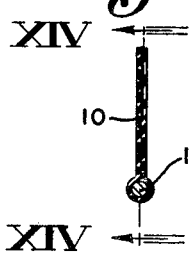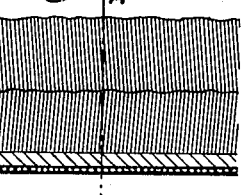

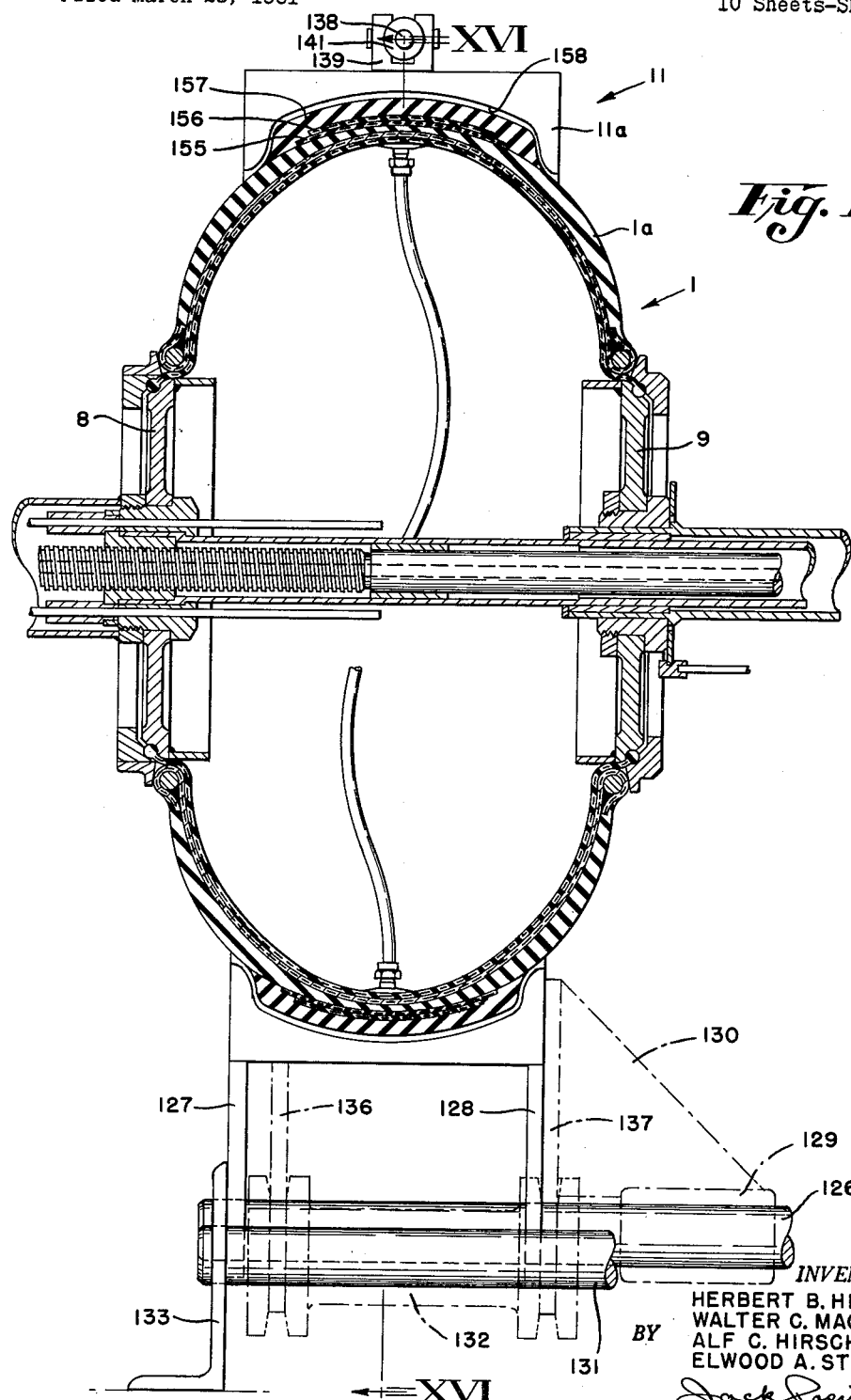

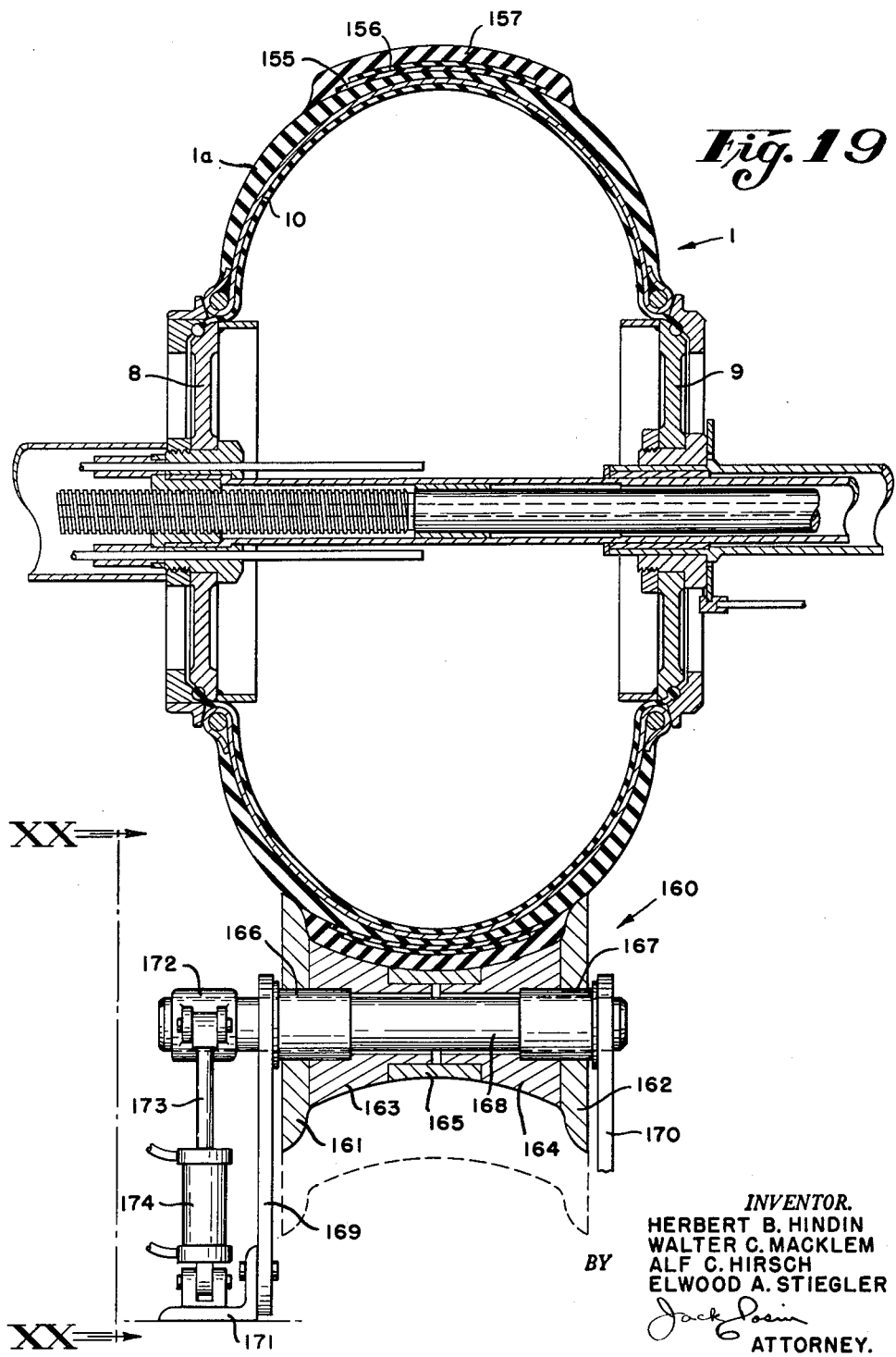

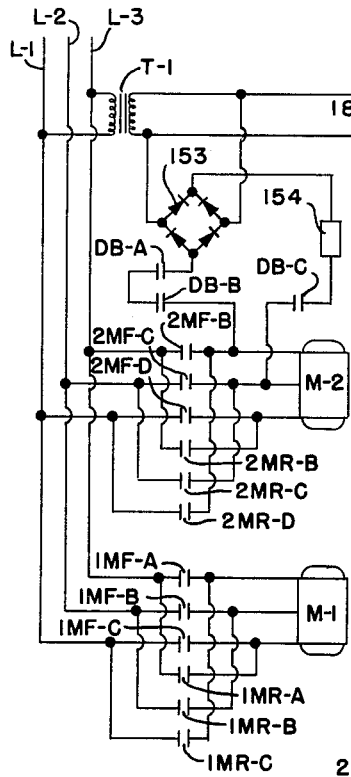

3,138,510
TIRE SHAPING MACHINE
Herbert B. Hindin, Southfield, and Walter C. Macklem, Detroit, Mich., Alf C. Hirsch, Sarasota, Fla., and Elwood A. Stiegler, Grosse Pointe Park, Mich., assignors to United States Rubber Company, New York, N.Y., a corporation of New Jersey
Filed Mar. 28, 1961, Ser. No. 98,843
5 Claims. (Cl. 156—416)

This invention relates to improvements in machines for building pneumatic tires. It includes features which are beneficial in the building of almost any standard type of pneumatic tire, although it is most particularly suited to the fabrication of radial ply tires.

In the manufacture of radial ply tires, comprised of single or multiple plies composed of wire and/or textile, it is conventional practice to wind the rubberized ply or plies on a revolving cylindrical tire building drum with the wires or cords forming high angles (in the neighborhood of 90°) to a plane that is perpendicular to the finished tire axis. The opposite ends of the ply or plies are each then folded around a rubberized bead wire, and sidewall and underbreaker stock are added. The semi-completed carcass is then removed from the tire building drum and placed on a shaping machine (or, alternatively, the carcass may have originally been built on a shaping machine drum), wherein a low angle wire breaker strip (or circumferential restraining ply) and a tread slab are added thereto, and the tire is brought to its ultimate shape.

The application of the breaker strip or strips to the semi-completed tire carcass is a critical step in the fabrication of a tire. It requires that the circumference of the tire carcass be extended to the precise diameter at which this component is to be added. Heretofore, this has, in one method, been accomplished by placing (or forming) the carcass on a shaping drum having movable end plates and an expansible and extensible central portion or bag formed of an elastic diaphragm-like material; locating a pair of expansion-limiting rings over but spaced from the periphery of the drum and spaced from one another; expanding the central portion of the carcass, by inflating the bag while at the same time bringing the end plates together until further expansion of the carcass is restricted by the rings; attaching the breaker strip and tread slab to the exposed area of the carcass between the rings; and separating the rings so that the function of restricting further circumferential expansion of the carcass is transferred to the breaker strip.

While satisfactory tires can be fabricated in the foregoing manner, complex and expensive equipment is required to restrict the tire carcass to a precise diameter for the addition of the breaker and tread. Moreover, it requires that highly skilled operators and/or involved control equipment be utilized in order to properly correlate the expansion of the carcass and the separation of the expansion-limiting rings with the application of the breaker and tread.

It has been determined, in accordance with this invention, that the tire building operation and the equipment required therefor can be considerably simplified without sacrificing accuracy in the step of applying the breaker to the carcass. This can be accomplished through the use of a shaping drum having an inextensible wire fabric reinforced expansible bag in place of the extensible elastic bag used in prior art devices. By utilizing an inextensible wire fabric reinforced bag having one ply at 90° to a plane perpendicular to the tire axis, or several thinner plies having intersecting angles of about 85° thereto, and clamping the ends of the bag to the end plates of the drum, unique characteristics may be achieved. The diameter of the bag (and the tire carcass positioned thereon), while under pressure, can be precisely controlled by the positioning of the end plates. Thus, a tire carcass can be expanded to some definite diameter to accept the breaker and tread without the use of the external expansion-limiting rings or containing members that have been required by the prior art. In addition, the wire reinforced bag permits the employment of higher inflation pressures, without causing excessive loading of the cords of the tire. The stresses resulting from the higher inflation pressures are absorbed by the bag and are not transferred to the tire carcass, thereby avoiding bead and ply lock disturbances in the tire.

Another important feature of this invention resides in the fact that improved stitching of the breaker and tread to the tire carcass may be obtained. Conventionally, after the breaker and tread have been added to the tire carcass and the breaker is serving to restrict circumferential expansion of the carcass, the entire assembly is mechanically roller stitched to insure proper adhesion between the various components thereof. In mechanical roller stitching, the assembly is mechanically compressed by means of rollers that are pressed against and translated along the outer periphery of the tire while the tire is rotated and the inflation pressure forces are being absorbed by the breaker.

It has been determined that mechanical roller stitching in the foregoing manner, while the breaker is under the stress of containing the inflation forces, frequently results in the development of harmful large and uneven stresses within the tire carcass during stitching which eventually result in a separation of and relatively early failure of the tire. The reduction and equalization of these stresses presents for satisfactory solution a problem with respect to designing improved methods and machines for stitching tire carcasses.

One form of solution to this problem, in accordance with this invention, involves the uses of the wire reinforced bag, rather than the breaker, to absorb the inflation forces during the mechanical roller stitching operation. Another solution advanced by this invention involves pneumatically stitching the breaker and tread to the tire carcass during the shaping operation. Pneumatic stitching, which will be described in greater detail hereinafter, may be characterized as the use of inflation pressure within the tire carcass to produce outwardly directed radial forces and radial movement of the tire carcass against a breaker and tread which are supported against radial displacement. This results in the stitching of the breaker and tread to the tire carcass without the development of the large and uneven stresses that lead to untimely failure of the tire.

An additional problem encountered in tire shaping machines involves the satisfactory control over the pressure fluid employed in shaping the tire carcass and the correlation of the pressure fluid flow with the operation of the machine. This problem has been alleviated, in accordance with the present invention, through the use of automatically controlled valve means to facilitate inflation and deflation of the drum concurrently with certain mechanical actions of the machine. This insures not only proper shaping of the tire carcass but easy removal of the tire carcass upon completion of the shaping operation.

Accordingly, one object of this invention is to provide an improved machine for manufacturing pneumatic tires.

A further object of this invention is to provide improved means for accurately controlling the expansion of a tire carcass in connection with the application of a breaker and tread thereto.

Another object of this invention is to provide an improved shaping machine for achieving improved stitching of the breaker and tread to the tire carcass.

An additional object of this invention is to provide a tire shaping machine having improved pressure valving controls for automatically correlating a pressure fluid flow with the mechanical actions of the shaping machine.

Further objects and advantages of this invention will become apparent as the following description proceeds.

Briefly stated, in accordance with one embodiment of this invention, there is provided a tire shaping drum having movable end plates and a cylindrical, inextensible, flexible diaphragm connected between the end plates about their peripheries. The end plates are moved from an extended position at which the tire carcass is placed on the shaping drum and air under pressure is added to the interior of the drum, to an intermediate position at which the breaker and tread are added to the partially toric shaped carcass while the inextensible diaphragm contains the outward forces of the air under pressure, and to a retracted position wherein the breaker and tread are radially restrained while the diameter of the tire carcass tends to expand so that pneumatic stiching is achieved and the tire carcass assumes the desired toric form. Pneumatic pressure valving means, operating in conjunction with the movement and positioning of the end plates of the shaping drum, is utilized to control the flow of pressurized air into and from the drum to facilitate both the shaping and stitching of the carcass and the subsequent removal of the tire from the drum.

While the specification concludes with claims particularly pointing out and distinctly claiming the subject matter which is regarded as the invention, it is believed that the invention will be better understood from the following description taken in connection with the accompanying drawings in which:

FIG. 1 is a side elevation view, with parts cut away for clarity, of a tire shaping machine embodying this invention;

FIG. 2 is an end elevation view of the machine shown in FIG. 1;

FIG. 3 is a sectional view, taken on the vertical center line of the shaping drum, showing a tire carcass mounted thereon for shaping;

FIG. 4 is a sectional view, taken along the line IV—IV of FIG. 2, showing details of various drive arrangements employed in the shaping machine;

FIG. 5 is a sectional view, similar to FIG. 4, showing additional features of the driving mechanism positioned between the shaping drum of FIG. 3 and the driving arrangements of FIG. 4;

FIG. 6 is a sectional view, taken along the line VI—VI of FIG. 5, showing the relationship between various coaxial shafts and sleeves and the manner of splining certain of the shafts and sleeves to each other;

FIG. 7 is a sectional view, taken along the line VII—VII of FIG. 3, showing the internal piping arrangement within the shaping drum;

FIG. 8 is an end elevation view showing details of the pressure valving arrangement;

FIG. 9 is a sectional view, taken along the line IX—IX of FIG. 3, showing details of the pressure valve actuating means;

FIG. 10 is a sectional view, taken along the line X—X of FIG. 3, showing additional details of the pressure valving arrangement;

FIG. 11 is an elevational view of a portion of the shaping drum, with parts cut away for clarity, showing a bayonet type locking arrangement for holding bead retaining and adapter rings in place on the shaping drum;

FIG. 12 is a sectional view, taken along the line XII—XII of FIG. 11, showing further details of the bayonet type locking arrangement;

FIG. 13 is a sectional view of an end portion of a flexible diaphragm employed in internally pressurizing the tire carcass;

FIG. 14 is a sectional view, taken along the line XIV—XIV of FIG. 13, showing the angular relationship of the wires in the ply comprising the diaphragm;

FIG. 15 is a sectional view, taken on the vertical center line of the shaping drum, showing a mounted tire carcass partially expanded with the breakers and tread applied thereto and the rear half of a restraining ring in place;

FIG. 16 is a sectional view, taken on line XVI—XVI of FIG. 15, showing the restraining ring halves connected together and the carcass expanded for pneumatic stitching;

FIG. 17 is a sectional view, taken on line XVII—XVII of FIG. 16, showing the progression and direction of forces during expansion and pneumatic stitching;

FIG. 18 is an elevation view, partly in section, taken on line XVIII—XVIII of FIG. 1, showing the manner in which the restraining ring halves are pivotally supported;

FIG. 19 is a sectional view, similar to FIG. 15, showing a modification of this invention wherein mechanical roller stiching is utilized in conjunction with the improved shaping drum;

FIG. 20 is an elevation view, taken on line XX—XX of FIG. 19, showing mounting details employed in the modification of FIG. 19;

FIG. 21 is a cross-sectional view of an adapting arrangement utilized to shape a tire having the same rim diameter as the tire shown in FIG. 17 but having a smaller cross-section;

FIG. 22 is a cross-sectional view, similar to that of FIG. 21, showing an adapting arrangement for shaping a tire having the same cross-section as the tire in FIG. 21 but having a larger rim diameter;

FIG. 23 represents a schematic wiring diagram of an electrical control system that may be utilized in controlling the operation of the tire shaping machine; and FIG. 24 represents a schematic piping diagram of a fluid control system used in conjunction with the electrical control system of FIG. 23 to supply control fluid to the tire shaping machine.

General Description

Referring now to FIG. 1, the general organization of a tire shaping machine made in accordance with this invention has been illustrated. A tire shaping drum, shown generally at 1, is rotatably carried by a hollow drive shaft 2, which, in turn, is mounted in left and right shaft bearings 3 and 4, respectively. A reversible electric drive motor M–2, which is drivingly connected to shaft 2 by means of a reduction gear 5, a pulley 5a, a belt 6, and a pulley 7, is employed to intermittently rotate the tire shaping drum 1 as desired by an operator.

The tire shaping drum 1 includes a left-hand end plate member 8, a right-hand end plate member 9, and a cylindrically shaped, wire-reinforced, diaphragm 10 that is clamped to the peripheral edges of the two end plates 8 and 9. The end plates 8 and 9 are mounted in such a manner as to be axially movable towards each other from the position shown in FIG. 1 in connection with expanding the tire carcass for the addition of the breaker and tread and in connection with the pneumatic stitching of the tire.

A restraining ring, shown generally at 11, including a back or first ring half 11a and a front or second ring half 11b, is provided adjacent the drum 1. The restraining ring halves 11a and 11b are adapted to be brought together to encircle the expanded portion of the tire carcass (after the breaker and tread have been applied) so that further expansion of the carcass results in pneumatic stitching. The details of the structure of the restraining ring 11 and the mode of cooperation with the drum 1 will be further amplified hereinafter.

In order to axially move the end plates 8 and 9 towards and away from each other, another reversible electric drive motor M–1 is provided. Drive motor M–1 is operatively connected to the end plates 8 and 9 through a clutch arrangement, shown generally at 12, the details of which will also be brought out subsequently.

The longitudinal movement of end plates 8 and 9 towards and away from each other is sensed and controlled by a plurality of limit switches LS-1, LS-2 and LS-3. These limit switches are arranged in a longitudinal row on the frame of the machine and are actuated by a cam 13, carried by an operating rod 14 that is rigidly connected to the end plate 9. In the position shown in FIG. 1, limit switch LS-3 has just been actuated by cam 13 and is providing a signal that the end plates have opened to their extended position. When the end plates 8 and 9 move towards each other, cam 13 deactuates limit switch LS-3 and, eventually, causes limit switch LS-2 to be actuated. This, in turn, provides a signal indicating that the end plates 8 and 9 have reached their intermediate position at which the restraining breaker and tread slab will be applied. Similarly, when the end plates 8 and 9 have reached their closest point of approach, cam 13 will actuate limit switch LS-1 to provide a signal that the end plates have reached their retracted position.

Referring now to FIG. 2, the various drive motors and the manner in which they are connected to the machine have been illustrated. Drive motor M-1, which is utilized to move the end plates 8 and 9 towards and away from each other, is connected to a reduction gear box having an output gear 16. A chain drive 17 connects the output gear 16 with a bull gear 18 that cooperates with the clutch arrangement 12 (FIG. 1) to drive the end plates 8 and 9 towards and away from each other.

A generally trapezoidal shaped foundation, including front plate 19, rear plate 19a and top plate 19b forms the supporting structure or frame of the shaping machine. Base cross members 20 cooperate with front and rear plates 19 and 19a to provide a rigid foundation for the motors M-1 and M-2, the motor M-1 being supported in an angularly displaced and elevated position from motor M-2, for clearance purposes, by brackets 21 and 22.

*The Drive Arrangements*

The details of the drive arrangements by which the shaping drum 1 and the end plates 8 and 9 are, respectively, rotated and axially translated may be seen by reference now to FIG. 3, FIG. 4, and FIG. 5, which, while drawn to different scales for convenience of illustration, represent the left-hand, right-hand, and central portions, respectively, of the drive arrangements. An outer hollow sleeve 24 and an inner hollow sleeve 25 are coaxially mounted within drive shaft 2. The hollow sleeves 24 and 25 are splined to each other and to the drive shaft 2, and are of such diameters and lengths that they can be rotated by the drive shaft 2 and also may be telescoped together. The telescopic movement is initiated by a central threaded shaft 26 which has formed therein a passageway 27 for conducting pressurized air to the tire building drum. A detailed discussion relating to the telescopic drive appears hereinafter.

The manner of supporting the various sleeves and shafts will now be considered. As previously indicated, the drive shaft 2 is rotatably carried by the left and right-hand shaft bearings 3 and 4. A bushing 28 (FIG. 4), which is held in place against a shoulder 28a formed in the inner peripheral surface of drive shaft 2 by a locking sleeve 29, provides a support for the right-hand portion of the outer hollow sleeve 24. The inner peripheral surface of bushing 28 is of a smaller diameter than the inner peripheral surfaces of both the drive shaft 2 and the locking sleeve 29 and serves as a bearing surface for the outer hollow sleeve 24 during the axial translation (telescopic movement) of that sleeve. A bushing 30 (FIG. 3), also mounted on the inner peripheral surface of drive shaft 2, serves to support the left-hand portion of outer hollow sleeve 24.

The inner hollow sleeve 25 is slidingly supported within outer hollow sleeve 24 by means of a right-hand bushing 31 (FIG. 5) which is held in place against a shoulder 31a in the inner peripheral surface of outer hollow sleeve 24 by a locking sleeve 32, and a left-hand bushing 33 (FIG. 3) that is clamped in position by a retaining ring 34.

The inner hollow sleeve 25 and threaded central shaft 26 are also maintained in alignment with each other by means of a pair of bushings. Left-hand bushing 35 (FIG. 3) is mounted on the inner surface of hollow sleeve 25 to provide a guiding and supporting surface adjacent the left end of shaft 26 and right-hand bushing 36 (FIG. 5) performs a like function adjacent the right end of shaft 26. Thus, the various shafts and sleeves are supported one within the other for proper relative movement therebetween and the entire load in carried by the frame of the machine through the bearings 3 and 4 mounted thereon.

As previously indicated, drive shaft 2, outer hollow sleeve 24, and inner hollow sleeve 25 are splined together so that rotary movement of drive shaft 2 is transmitted to the sleeves, while the sleeves 24 and 25 may be axially telescoped together. This is accomplished in the following manner. Drive shaft 2 (FIG. 5) has rigidly mounted thereon a key 37 which slidingly engages a longitudinal slot 38 formed in the outer surface of outer hollow sleeve 24. This arrangement allows outer hollow sleeve 24 to move longitudinally with respect to drive shaft 2 but insures that any rotational movement of the drive shaft 2 will be transmitted to the outer hollow sleeve 24. Similarly, outer hollow sleeve 24 fixedly carries a key 39 which, in turn, slidingly engages a longitudinal slot 40 formed in the outer surface of the inner hollow sleeve 25. This key and slot arrangement performs a similar function to the previously described key and slot arrangement in that it allows the inner hollow sleeve 25 to move longitudinally with respect to the outer hollow sleeve 24 and yet insures that rotary motion from the drive shaft 2 will be transmitted to the inner hollow sleeve 25.

An opening 41, formed in the drive shaft 2 and having a removable cover plate 42 thereover, is provided to allow access through the drive shaft 2 to the key 39 in the event it becomes necessary to replace that key or perform other repair work within the drive shaft 2.

The concentric construction of drive shaft 2, outer and inner hollow sleeves 24 and 25, and threaded central shaft 26, and the arrangement by which keys 37 and 39 and slots 38 and 40 are employed as splines, has been illustrated on a larger scale in the cross-sectional view of FIG. 6.

Referring now to FIG. 3, the manner in which end plates 8 and 9 are fastened to inner hollow sleeve 25 and outer hollow sleeve 24, respectively, has been illustrated. Right-hand end plate 9 is rigidly clamped to a hub member 43 by a clamping ring 44, the hub member 43 being welded or otherwise fixedly carried by outer hollow sleeve 24. Similarly, left-hand end plate 8 is mounted upon a hub member 45 and held in position by a clamping ring 46, the hub member 45 being welded or otherwise fixedly mounted upon inner hollow sleeve 25. It will thus be apparent that telescopic movement of inner hollow sleeve 25 and outer hollow sleeve 24 will result in movement of end plates 8 and 9 towards each other, both the intermediate position and the closest point of approach between end plates 8 and 9 being shown in dotted lines in FIG. 3 and these positions corresponding to the positions at which limit switches LS-2 and LS-1, respectively, (FIG. 1) become actuated.

The relative movement of end plates 8 and 9 towards each other is obtained by the independent rotation of threaded central shaft 26. Referring more particularly to FIGS. 3 and 4, it may be seen that the central shaft 26 is provided with left-hand and right-hand threaded end portions 47 and 48, respectively. Left-hand threaded end portions 47 is conventionally threaded, whereas the right-hand threaded end portion 48 is reversely threaded. A drive nut 49 (FIG. 3), which is rigidly attached to inner hollow sleeve 25 and conventionally threaded, cooperates with left-hand threaded end portion 47 of shaft 26 to move end plate 8 to the right when the central shaft is rotated clockwise (as viewed from the right side of FIG. 3). Similarly, a drive nut 50 (FIG. 4), which is carried by outer hollow sleeve 24 and reversely threaded, cooperates with right-hand threaded end portion 48 of shaft 26 to move the outer hollow sleeve 24 and, consequently, end plate 9, to the left, when the central shaft 26 is rotated in a clockwise direction as before. Thus, rotation of central shaft 26 in one direction or another will cause the end plates 8 and 9 to either approach each other or move away from each other, as desired.

The clutch arrangement 12 (FIG. 4) is employed to impart rotation to central drive shaft 26 to effect the desired movement of the end plates 8 and 9. Rotary input from end plate drive motor M-1 (FIG. 1) is transmitted to bull gear 18 (FIG. 4) by means of the chain drive 17, as previously described. Bull gear 18, in turn, is carried by a hub member 51, the hub member 51 also serving as a support for a pneumatically inflatable clutch 52. The inflatable clutch 52 comprises an annular resilient member having an annular chamber 53 which may be pressurized to cause radial elongation of the clutch 52. Clutch 52 further includes an outer clutching surface 54 which engages a driven cup-shaped clutch plate 55 when the annular chamber 53 is pressurized. The normal, unpressurized, condition of the pneumatically inflatable clutch 52 is as shown in FIG. 4; however, upon pressurizing chamber 53, the clutch surface 54 advances radially into contact with the clutch plate 55 to cause it to rotate in unison with the bull gear 18. Thus, rotation of the bull gear is transmitted through to the clutch plate 55 when the clutch 52 is pressurized.

The clutch plate 55 is welded or otherwise rigidly secured to a hub member 56 which, in turn, is keyed to threaded central shaft 26 by means of the key 57. Hub member 56 is separated from the hub member 51 by a bushing 58 in order that relative rotation may take place between the two members when clutch 52 is disengaged from clutch plate 55.

The means by which air under pressure is conveyed to chamber 53 to actuate clutch 52 is as follows. A conduit 59 is provided to connect the annular chamber 53 of clutch 52 with an annular chamber 60, portions of which are formed in each of bushing 58 and hub member 56. This is done in order to compensate for the relative rotation between hub member 51 and hub member 56. A passageway 62, formed in hub member 56, connects the annular chamber 60 with another passageway 62 formed in an end plate 63 that is fastened to the hub member 56. A flange 64, which is welded or otherwise connected to end plate 63 and rotates therewith, serves to connect the end plate 63 with a stationary "Fawick Rotor Seal," shown generally at 65, of the type made by Fawick Corporation, Model No. FD. The rotor seal 65 is provided with dual conduits 66 and 67. Conduit 66 connects passageway 62 with an air supply pipe 68 to provide a pressure source for the clutch 52, and conduit 67 connects an air supply pipe 69 with the passageway 27 located at the center of the threaded central shaft 26. An annular chamber 70, formed in the end face of end plate 63, serves to maintain continuity of the air supply between passageway 62 and conduit 66 at the interface between the rotating end plate 63 and the stationary rotor seal 65. An O ring 71, or similar sealing arrangement, may be employed to prevent leakage at this surface.

It will be apparent now that upon pressurization of air supply pipe 68, clutch 52 will expand radially causing engagement with clutch plate 55. This, in turn, will result in the rotary movement of bull gear 18 being transmitted through clutch plate 55, hub 56 and key 57 to the threaded central shaft 26. Upon rotation of the threaded central shaft, outer and inner hollow sleeves 24 and 25, respectively, will be telescopically driven in opposite directions by their respective drive nuts 50 and 49 to result in movement of the end plates 8 and 9 either towards or away from each other, depending upon the direction of rotation of reversible drive motor M-1. Thus, movement of the end plates 8 and 9 towards or away from each other is controlled independently of the rotation of tire shaping drum 1 by its drive motor M-2.

The manner in which tire shaping drum 1 is rotated will now be described. Drive motor M-2 (FIG. 1) imparts rotary motion to pulley 7 by means of belt 6, pulley 5a and reduction gear 5, as previously indicated. Pulley 7 (FIG. 4) is mounted on a disk 72, which, in turn, is supported by drive shaft 2 and is keyed thereto by a key 73. Drive shaft 2 is reinforced in the area of the disk 72 by a sleeve 74 mounted internally thereof for rotation with the drive shaft 2. A bushing 75 separates the sleeve 74 from the threaded central shaft 26. Bushing 75 facilitates the support of disk 72 and allows relative rotation to occur between the threaded central shaft 26 and drive shaft 2. A thrust plate 77 and a retaining ring 78 serve to axially position and locate with respect to each other the various components associated with the clutch arrangement 12 and the disk 72. Thus, rotation of the pulley 7 by drive motor M-2 results in the transmission of rotary motion to the disk 72, the drive shaft 2, the outer hollow sleeve 24 (by means of the key 37 and slot 38 shown in FIG. 5), the inner hollow sleeve 25 (by means of key 39 and slot 40) and, from the inner and outer hollow sleeves, to the end plates 8 and 9 (FIG. 3), thereby turning the tire shaping drum 1.

With pneumatic clutch 52 disengaged, the rotation of the outer and inner hollow sleeves 24 and 25 by drum drive motor M-2 will cause the threaded central shaft 26 to rotate in unison with the sleeves due to the fact that the drive nuts 49 and 50 (FIG. 3 and FIG. 4, respectively) rotate with the sleeves and frictionally bear on shaft 26. Upon engagement of the clutch 52, however, the threaded central shaft 26 may be driven independently of the hollow sleeves to both move the end plates and, additionally, to operate valve means, shown generally at 80 in FIG. 3, for directing the flow of pressurized air to and from the tire shaping drum 1 in a manner described below.

*The Valve Means*

Valve means 80, which is surrounded by a protective sleeve member 81 carried by the clamping ring 46, is employed to control the flow of air into the tire shaping drum 1, into the space between the flexible diaphragm 10 and the inside surface of a tire carcass 1a on the tire drum 1, and out of both of the aforementioned spaces to the atmosphere. The details of construction of valve means 80 and the manner in which the valve means 80 is operated has been illustrated in FIGS. 3, 7, 8, 9 and 10.

As may be seen in FIG. 3 the valve means 80 includes a valve housing 82 and a valve member 83. The valve housing 82 is carried by end plate 8 of the tire shaping drum 1 and rotates therewith. The valve member 83 is connected to the threaded central shaft 26 by means of a slip clutch arrangement, shown generally at 84, to allow limited rotary movement of the valve member 83 within the housing 82 upon rotation of the threaded central shaft 26. Valve member 83 is coupled to a driven member 85 of the slip clutch arrangement 84 by means of a set screw 86 that is mounted through an aperture 86a in the valve housing 82 to lock the valve member 83 to the driven member 85. Thus, rotation of the driven member 85 of the slip clutch 84 will result in rotary movement of the valve member 83 within the valve housing 82 between certain limits to be described.

The passageway 27 formed in the threaded central shaft 26 extends through the slip clutch arrangement 84, and driven member 85, and terminates in a centrally located chamber 87 within the valve member 83.

A pair of diametrically opposed radial passageways 88 and 89 connect the central chamber 87 with various ones of a plurality of pipes, two of which are shown at 90 and 91 in FIG. 3, to conduct pressurized air to either the interior of tire shaping drum 1 or the space between flexible diaphragm 10 and the inner surface of the tire carcass 1a, depending on the position of valve member 83. Pipes 90 and 91 slidably pass through hub member 45, in order to allow relative axial movement therebetween to compensate for the axial movement of end plate 8, and terminate within and communicate with the interior of the tire shaping drum 1. This arrangement allows the interior of tire shaping drum 1 to be pressurized when the valve means 80 is in the position shown in FIG. 3.

Referring to FIGS. 7, 8, 9 and 10, it may be seen (FIG. 9) that additional pipes 92 and 93, which are diametrically opposite to each other in a horizontal plane, project from the valve housing 82 towards the tire shaping drum 1. Pipes 92 and 93 communicate (FIG. 7) with flexible conduits 94 and 95, respectively. The conduits 94 and 95, in turn (FIG. 3), connect with apertures 96 and 97 in the flexible diaphragm 10 to allow pressurized air to enter and leave the space between the flexible diaphragm 10 and the tire carcass 1a mounted thereabout. Thus, it may be seen that the pipes 92 and 93 are employed to direct air into and out of the space between the flexible diaphragm 10 and the tire carcass 1a, while the pipes 90 and 91 are employed to direct air into and out of the interior of the tire shaping drum 1.

Referring now to FIGS. 8 and 10, the manner in which valve member 83 cooperates with valve housing 82 to direct the air flow will be further explained. A stud 98, carried by the end face of valve housing 82, projects inwardly through the valve housing to engage an arcuate groove 99 formed in the rear wall of the valve member 83. The circumferential or arcuate length of the groove 99 is such as to permit the valve housing 83 to be rotated an angular distance of 90° before the ends of the slot or groove 99 hit up against the stud 98. This, in turn, allows the radial passageways 88 and 89 to be shifted from pipes 90 and 91, respectively, to pipes 92 and 93, respectively, to facilitate supplying pressurized air to the space between the tire carcass 1a and the flexible diaphragm 10 to aid in collapsing the diaphragm 10 to remove the tire after the breaker and tread slab application, shaping, and stitching operations have been completed.

It should also be noted at this time that the valve member 83 is provided with radial passageways 100 and 101 (FIGS. 8 and 10). These passageways, rather than connecting with the central chamber 87, terminate in openings 102 and 103 in the outward end face of the valve member 83. The outward end face of the valve housing 82 is also provided with a plurality of apertures 104, 105, 106, and 107 (FIG. 8) that pass through the end plate to allow communication between the surrounding atmosphere and the openings 102 and 103 of the valve member 83. It should be noted that each of the apertures 104 through 107 is radially aligned with one of the pipes 90 through 93. In the position shown in FIG. 8, opening 102 in the valve member 83 is in alignment with aperture 104 and, therefore, pipe 93 is at atmospheric pressure. The atmospheric pressure (FIG. 7 and FIG. 3) is in turn felt in the space between the tire carcass 1a and the flexible diaphragm 10. Similarly, opening 103 in valve member 83 is in communication with aperture 106, and, therefore, atmospheric pressure also exists in pipe 92.

Assuming that central chamber 87 of the valve member 83 is under pressure (FIG. 8), the pressurized air would be conducted via passageways 88 and 89 to pipes 90 and 91, thereby placing the interior of the tire shaping drum 1 under pressure. It should be noted, in this regard, that there is no opening through the outer end face of valve member 83 along the length of the passageways 88 and 89, and, therefore, there is no loss of pressure through apertures 105 or 107.

Should the valve member 83 be rotated 90° clockwise from the position shown in FIG. 8, it is apparent that the pressure in pipes 90 and 91 will thereupon drop to atmospheric pressure (due to the registry of opening 102 with aperture 107 and opening 103 with aperture 105) and that pressurized air will be introduced into pipes 92 and 93 (since passageways 88 and 89 cannot communicate with apertures 104 and 106). This, in turn, would cause a decrease in pressure within the drum 1 and a rise in pressure between the carcass 1a and the diaphragm 10 to collapse the diaphragm and facilitate removal of the flexible diaphragm from the interior of the shaped tire carcass by the subsequent movement of end plates 8 and 9 away from each other.

Referring now to FIGS. 3 and 9, the manner in which the slip clutch arrangement 84 is employed to angularly move the valve member 83 within the valve housing 82 has been illustrated. The slip clutch arrangement 84 includes the previously mentioned driven member 85 and a driving member 108. Driving member 108 is rigidly connected to the end of the threaded central shaft 26 by means of bolts 109 (FIG. 9) and is provided with a pair of axially projecting studs 110. The slip clutch arrangement 84 is also provided with a pair of semi-circular clutching members 111 and 112 which, together, form an annular clutching member whose inner surface is in engagement with the driven member 85. A pair of spring loaded bolts 113 are utilized to hold the two halves of the clutching member together about the driven member 85. The end faces of clutching members 111 and 112, which are in near abutting relationship to one another, are hollowed out as indicated at 114 to form a circular opening into which the axially extending studs 110 are fitted. With this arrangement, any rotation of driving member 108, due to the rotation of threaded central shaft 26, will be imparted to the driven member 85 (and valve member 82) so long as the valve member 82 is relatively free to move. However, when the stud 98 (FIG. 10) engages the end of the groove or slot 99, thereby imparting a high resistance to rotary movement of the valve member 83, the clutching members 111 and 112 will begin slipping about the driven member 85 and no further rotary movement will be transmitted to the valve member 83. The clutching members 111 and 112 are provided with recesses 115 on their inner peripheral surfaces to facilitate engage with driven member 85 and prevent undue heat generation due to slippage.

With the foregoing construction, any independent rotation of threaded central shaft 26 by end plate drive motor M-1 in a direction opposite to its previous independent movement will result in valve member 83 being rotated 90° with respect to the valve housing 82. This, in turn, changes the pressure relationship in both the interior of the tire shaping drum 1 and in the space between the flexible diaphragm 10 and the tire carcass 1a, assuming that the passageway 27 is under pressure at the time of the movement of the valve member 83. The means for controlling admission of air under pressure into passageway 27 will be described hereinafter.

*Shaping Drum Details*

Referring now to FIGS. 3, 11 and 12, structural details of the tire shaping drum 1 and features which facilitate the loading and unloading of tire carcasses on the shaping drum 1 have been illustrated. A diaphragm clamping ring 116 (FIG. 3) is fastened to end plate 9 by means of bolts 117. Ring 116 serves the dual function of sealingly clamping one end of the flexible diaphragm 10 to the end plate 9 and of providing an abutment 116a which acts against the bead of the tire carcass in moving the bead inwardly during the shaping operation. A second diaphragm clamping ring 118, held in place on end plate 8 by means of bolts 119, is used to sealingly clamp the other end of flexible diaphragm 10 in forming the drum 1. A removable bead retaining ring 120, which is mounted about the outer periphery of diaphragm clamping ring 118, facilitates the loading and unloading of tire carcasses on the drum 1.

As may be clearly seen in FIG. 11, diaphragm clamping ring 118 is provided with a plurality of radially extending lugs 121 at circumferentially spaced points about its periphery. T-shaped slots 122 are cut partially through the bead retaining ring 120 in an axial direction and join with circumferentially extending slots 123 to provide a "bayonette" type clamping arrangement for holding the bead retaining ring 120 in position on the diaphragm clamping ring 118. Thus, in the arrangement shown in FIG. 11, by rotating bead retaining ring 120 counterclockwise and applying a withdrawing force thereto, the bead retaining ring 120 may be removed from the diaphragm clamping ring 118 to facilitate removal of a shaped tire carcass and replacement thereof by a new tire carcass.

FIG. 12 shows a cross-sectional view of the engagement between the bead retaining ring 120 and the diaphragm clamping ring 118 and, additionally, illustrates the abutment between shoulders 124 and 124a which correctly position the two rings in axial relationship to each other.

FIGS. 13 and 14 illustrate the structural configuration of the inextensible flexible diaphragm 10. The diaphragm 10 comprises a cured ply of wire tire fabric folded around a bead wire 125 and spliced back upon itself to form a two-ply diaphragm. It should be noted that the wires of the diaphragm fabric are at a high angle (in this case 85°) with a plane perpendicular to the longitudinal axis A—A of the tire shaping drum 1. This insures that the diaphragm 10 will be relatively inextensible so that the peripheral diameter of the carcass can be accurately controlled for the application of the breaker and tread slab by the positioning of end plates 8 and 9. It also allows higher inflation pressures to be employed which, in turn, causes the diaphragm 10 to form a rigid surface for processing the tire carcass. Alternatively, a single ply diaphragm in which the wires are at 90° angles with a plane perpendicular to the longitudinal axis of the drum can be utilized in an effective manner.

The Restraining Ring

Referring to FIGS. 1, 2, 15, 16, 17 and 18, the structural details of and mounting arrangement for the restraining ring 11, which is employed in the pneumatic stitching operation, will now be considered. As indicated earlier, the restraining ring 11 includes a semicircular first or back ring half 11a and a semicircular second or front ring half 11b, both of which are swingable with respect to the drum 1 to form the carcass encircling restraining ring 11 when they are clamped together.

The back ring half 11a is pivotally mounted on a horizontal rod 126 by means of spaced depending arms 127 and 128 that are welded to opposite sides of the ring half near the lower extremity thereof. The front ring half is pivotally and also slidably mounted on horizontal rod 126 by means of a sleeve 129 and a gusset plate 130, which is welded both to the sleeve 129 and to one side of the lower extremity of the front ring half 11b. A second horizontal rod 131, parallel to rod 126, is provided with a flanged sleeve member 132 slidably mounted thereon to support front ring half 11b when it is in its inactive or open position. The parallel rods 126 and 131 are each supported at one of their ends by an angular member 133 and at the other of their ends by a pad 134 mounted on the framework of the machine.

In order to support back ring half 11a in the open position, a stop member 135 (FIG. 16) is provided on the angular member 133. Stop member 135 cooperates with the depending arm 127 to hold the back ring half 11a open prior to the pneumatic stitching operation, as illustrated by the dotted lines in FIGS. 16 and 18. Front ring half 11b is provided with depending plate members 136 (FIG. 16) and 137 (FIG. 18) which cooperate with the flanged sleeve member 132 in order to support the front ring half 11b in the open position.

The pivotal connections employed in connecting the ring halves 11a and 11b to rod 126 also allow the ring halves to be moved longitudinally with respect to rod 126. Thus, referring to FIG. 1, it may be seen that the front ring half 11b (or both ring halves, if desired) may be moved clear of the central portion of the shaping drum 1 in order to clear this area for the application of the breaker and the tread slab.

A threaded member 138 (FIG. 16) pivotally mounted in a block 139 attached to the top of rear ring half 11a is cooperable with a grooved block 140 carried by the front ring half 11b to clamp the two ring halves together in the closed or operative position, a nut 141 being provided for this purpose.

Electrical and Pneumatic Controls

The electrical and pneumatic controls for the shaping machine have been illustrated in FIGS. 23 and 24. A three phase A.C. power supply of, for example, 440 volts is brought in on wires L–1, L–2 and L–3 through a circuit breaker (not shown) to provide power for the drive motors M–1 and M–2 and, additionally, to provide a source of control voltage for controlling the operation of the machine. A step-down transformer T–1 connected across the L–1, L–3 phase is employed to reduce the voltage to a suitable value (for example 110 volts) for control purposes. Assuming that the tire shaping machine is in the condition shown in FIG. 1 and that a tire carcass has been placed on the drum, limit switch LS–1 (normally closed) will be in the position shown in FIG. 23 and LS–3 (normally closed) will be open, due to the action of cam 13 on this limit switch.

In order to start the machine, push-button switch 150 is depressed and its contacts 151 and 152 close, thereby energizing end plate forward drive motor relay 1MF and time delay relay TD–1. The energization of relay 1MF results in the closing of its contacts 1MF–A, 1MF–B and 1MF–C to start end plate drive motor M–1 driving in a forward direction. Simultaneously with the starting of motor M–1, contacts 1MF–D close to energize clutch solenoid valve SV–1. This (FIG. 24), in turn, causes the clutch arrangement 12 to be actuated, connecting threaded central shaft 26 to the end plate drive motor M–1 (FIG. 4). Hence, end plates 8 and 9 begin to move towards each other and, in addition, valve member 83 (FIG. 10) assumes the position shown in FIG. 3 wherein conduit 27 of the threaded central shaft 26 is in communication with pipes 90 and 91 going to the interior of the tire shaping drum 1. During the previous control actions, contacts 1MF–E also close to lock in relay 1MF independently of push button switch 150, through the normally closed limit switch LS–2. Similarly, contacts 1MF–F open with the energization of relay 1MF to insure that end plate reverse drive motor relay 1MR thereafter remains de-energized.

It will be remembered that when push button switch 150 was depressed time delay relay TD–1 was energized concurrently with relay 1MF. At this time contacts TD–1A closed, providing an alternate source of energization for relay TD–1 independent of push button switch 150. The energization of relay TD–1, additionally, results in the closing of its contacts TD–1B and TD–1C to energize inflation solenoid valve SV–2. It should be noted that contacts TD–1B, while picking up instantaneously, are so arranged as to introduce a few seconds time delay upon de-energization of the relay before they open. Referring to FIG. 24 it will be observed that solenoid valve SV–2, when energized, serves to allow pressurized air to flow from a source (not shown), through pipe 69, passageway 27, valve means 80, and into tire shaping drum 1 to inflate both the tire carcass 1a and the inextensible flexible diaphragm 10. Thus, the initial action of the machine is to start moving the end plates 8 and 9 towards each other and simultaneously apply pressure to the interior of the drum 1 to commence shaping the tire carcass 1a.

The inflation of tire shaping drum 1 and movement of the end plates 8 and 9 towards each other continue until (FIG. 1) cam 13 comes into engagement with limit switch LS–2. At this time limit switch LS–2 (FIG. 23) opens, thereby breaking the circuit to relay 1MF and stopping end plate drive motor M–1. Since time delay relay TD–1 remains energized, even though relay 1MF drops out, inflation solenoid valve SV–2 remains energized and pressurized air continues to be applied to the interior of tire shaping drum 1. It should be noted that, upon de-energization of relay 1MF, contacts 1MF–D open to drop out clutch solenoid valve SV–1 and, referring to FIG. 24, it is apparent that the clutch arrangement 12 becomes de-actuated. This is done in order to prevent subsequent binding between the threaded central shaft 26 and end plate drive motor M–1 (and a possible change in both the valve means 80 and position of the end plates 8 and 9 when tire shaping drum 1 is subsequently rotated by drum drive motor M–2). It should be noted at this point that the positioning of limit switch LS–2 precisely controls the diameter to which the tire carcass expands when the end plates 8 and 9 converge. This is due to the fact that diaphragm 10 is inextensible and is rigidly clamped to the end plates.

With clutch arrangement 12 disengaged and the end plates at their intermediate or LS–2 position, either of foot switches FS–1 or FS–2 may be actuated to energize either relay 2MR or relay 2MF, respectively. Relay 2MF will cause rotation of the tire shaping drum 1 in one direction and relay 2MR will cause rotation of the tire shaping drum in an opposite direction. The direction of rotation is arbitrary and for the convenience of the operator in applying the breaker strip or strips and tread slab to the tire carcass 1a while the carcass is in the intermediate position.

Assuming that foot switch FS–2 has been depressed, relay 2MF becomes energized, thereby opening contacts 2MF–A in the circuit to relay 2MR and closing contacts 2MF–B, 2MF–C and 2MF–D in order to energize drum drive motor M–2. Additionally, contacts 2MF–E close, thereby energizing a second time delay relay TD–2. Relay TD–2 preconditions a line to a dynamic braking relay DB by means of its contacts TD–2A and TD–2B. Contacts TD–2B are of the time delay type which, upon de-energization of the relay, stay closed a few seconds before they open. Contacts TD–2A, on the other hand, act substantially instantaneously. Assuming that the operator has been rotating the shaping drum 1 by foot switch FS–2, and has applied the breaker and tread slab to the tire carcass, when he de-actuates foot switch FS–2 contacts FS–2A will open, de-energizing relay 2MF, and contacts FS–2B will close. The dropping out of relay 2MF results in the de-energization of time delay relay TD–2 by contacts 2MF–E and this, in turn, in conjunction with the closing of foot switch contacts FS–2B, provides a completed circuit to dynamic braking relay DB through the still closed time delay contacts TD–2B of relay TD–2. Thus, dynamic braking relay DB becomes energized when the foot switch is de-actuated.

A rectifier bridge 153, which is connected across the output terminals of transformer T–1, provides a D.C. voltage through contacts DB–A, DB–B and DB–C and a current limiting resistor 154 to one phase of the three phase drum drive motor M–2 to provide a clamping or braking action on that motor. This results in quick stopping of the tire shaping drum 1 when the foot switch FS–2 is released. Relay DB, of course, de-energizes immediately thereafter, due to the opening of time delay contacts TD–2B, and the D.C. braking voltage is removed from motor M–2.

A similar sequence of events occurs when the foot switch FS–1A is depressed and then released; however, in this case the drum drive motor M–2 is driven in the opposite direction by the energization of relay 2MR which, in turn, reverses the phase relationship to drum drive motor M–2 through its contacts 2MR–B, 2MR–C and 2MR–D. It will be apparent from the foregoing that the operator may drive the shaping drum 1 in either a forward or a reverse direction as deemed necessary in order to properly apply the breaker strip or strips and tread slab to the tire carcass.

Upon completion of the application of the breaker and tread slab, and with drum drive motor M–2 now stopped, the operator closes the restraining ring 11 about the central portion of the tire carcass, in the manner shown in FIG. 15, to prepare for pneumatic stitching of the breaker and tread slab to the carcass. The operator then depresses push-button switch 150 to re-energize end plate forward drive motor relay 1MF. This again results in the closing of contacts 1MF–A, 1MF–B and 1MF–C to the end plate drive motor M–1, causing this motor to begin rotating in the same direction as it did in moving the end plates 8 and 9 to the intermediate or LS–2 position. Similarly, it should be noted that contacts 1MF–D again energize clutch solenoid valve SV–1 so that end plate drive motor M–1 becomes mechanically connected with threaded central shaft 26 to cause the end plates to begin moving from their intermediate or LS–2 position to their retracted or LS–1 position. Referring to FIG. 1, it will be apparent that push button switch 150 must be depressed for a sufficient period of time for cam 13 to pass over limit switch LS–2 in order that (FIG. 23) contacts 1MF–E and limit switch LS–2 will provide a locking-in path for relay 1MF.

It will be remembered that time delay relay TD–1 and, consequently, inflation solenoid valve SV–2 have remained energized both during the movement of the end plates from the LS–3 to the LS–2 position and during the application of the breaker and tread slab. They also remain energized during the movement of the end plates from the LS–2 position to the LS–1 position. Thus, inflation pressure is maintained within the tire shaping drum 1 during the entire operation of applying the breaker and tread slab, pneumatically stitching them to the carcass, and shaping the tire.

Referring to FIGS. 15, 16 and 17, the pneumatic stitching operation will now be considered in greater detail. FIG. 15 shows the end plates 8 and 9 in their intermediate position. The breaker strips 155 and 156, and the tread slab 157, have been applied to the carcass 1a and the restraining ring 11 has been closed about the central portion of the inflated drum 1.

It will be understood that the breaker strips 155 and 156, while normally thought of as being inextensible, are not completely inextensible when built into a tire. The reason for this is that slightly extensibility is desirable due to the necessity of allowing for a limited expansion of the tire in the mold or press during the curing operation in order to remove any waviness in the cords or wires of the carcass and to provide a satisfactory molding operation. This feature of slight extensibility of the breaker strips is employed to advantage in the pneumatic stitching operation.

Remembering that the operator has again depressed the push button switch 150 to cause end plates 8 and 9 to converge from their intermediate or limit switch LS–2 position to their retracted or limit switch LS–1 position, and that restraining ring 11 is closed, it will be apparent that as the end plates 8 and 9 start to converge, the diameter of the tire tends to enlarge until the tread slab 157 comes into abutment with the inner surface 158 of the restraining ring 11. At this point the restraining ring 11 precludes the tire carcass 1a from expanding further (see FIG. 17), while the end plates 8 and 9 continue converging towards the retracted or limit switch LS–1 position. As a result of this, internal radial forces, designated by the arrows 159, develop against the inner surface of the carcass 1a. These forces compress the tread slab 158, the breaker strips 156 and 157, and the carcass 1a against one another to thereby stitch these components together. In addition, the radial forces 159 expand the sidewall portions of the tire carcass 1a into the desired final shape as determined by the final position of the end plates 8 and 9.

FIGS. 19 and 20 show an alternative arrangement for stitching the carcass 1a by conventional methods, while achieving the benefits of this invention obtainable by using the inextensible flexible diaphragm 10. In this modification the carcass 1a is stitched while the end plates 8 and 9 are in their intermediate or LS-2 position by pressing a contoured segmented roller, shown generally at 160, against the outer periphery of the carcass 1a, while rotating the shaping drum 1.

Roller 160 includes a pair of matched outer segments 161 and 162, a pair of matched intermediate segments 163 and 164 and a central segment 165, each of which may rotate independently of the others in order to compensate for variable surface speeds of the carcass 1a, and all of which are supported by bearings 166 and 167 mounted on shaft 168. Shaft 168, in turn, is rigidly secured in side link members 169 and 170 which are pivotally connected to angle members, one of which is shown at 171, supported by the floor. A sleeve 172, which is keyed to shaft 168, is pivotally connected to the piston rod 173 of a power cylinder 174 that is pivotally mounted on angle member 171. The actuation of power cylinder 174 causes the roller 160 to move upwardly into engagement with the outer surface of the carcass 1a, thereby pressing the tread slab 157 against the carcass while the inner surface of the carcass is supported by the inflated inextensible diaphragm 10. Upon rotating the drum 1, with roller 160 pressing against the carcass 1a, the breaker strips, tread slab and carcass become stitched together in an effective manner.

Resuming consideration of the electrical and pneumatic controls of FIGS. 23 and 24 and assuming that the tire carcass has been completely shaped and pneumatically stitched when the end plates 8 and 9 reach the retracted or limit switch LS-1 position, push-button switch 175 is then actuated to energize, through its contacts 176, end plate reverse drive motor relay 1MR, which, in turn, closes its contacts 1MR-A, 1MR-B and 1MR-C to end plate drive motor M-1, causing this motor to drive in a reverse direction. Simultaneously, contacts 1MR-F close, thereby energizing clutch solenoid valve SV-1 which actuates clutch arrangement 12 connecting the end plate drive motor M-1 to the threaded central shaft 26. This produces two concurrent mechanical actions. First, valve means 80 will be reversed to bleed air from the interior of the drum 1 and to introduce air under pressure into the space between the flexible diaphragm 10 and the tire carcass 1a. Second, the threaded central shaft 26 will be reversely driven to separate the end plates 8 and 9 until limit switch LS-3 is eventually re-actuated. The latter action causes relay 1MR to become de-energized and, in turn, stops end plate drive motor M-1 with the end plates at their extended or LS-3 position. Clutch solenoid SV-1 is de-energized at this time, also, by contacts 1MR-F. It should be noted that when push-button switch 175 was depressed to energize relay 1MR, this relay locked itself in by means of contacts 1MR-D so that the release of push-button switch 175 would not cause the relay to drop out. Also, contacts 1MR-E opened to prevent an interlock against untimely energization of relay 1MF.

It should also be noted that simultaneously with the depression of push-button switch 175, its contacts 177 open. This causes time delay relay TD-1 to de-energize, thereby opening contacts TD-1C in the line to solenoid valve SV-2. However, since contacts TD-1B are of the delayed opening type and contacts 1MR-G are now closed, solenoid valve SV-2 remains energized. A few seconds later, time delay contacts TD-1B open, thereby de-energizing the inflation solenoid valve SV-2 and ending the flow of pressurized air to the valve means 80.

Thus, air is supplied to the valve means 80 after the end plates 8 and 9 start moving apart, and, since valve means 80 has shifted position, the few seconds of air supplied by the time delay breaks the seal between the flexible diaphragm 10 and the interior surface of the tire carcass 1a and collapses the diaphragm. This facilitates withdrawal of the diaphragm 10 from the interior of the shaped tire carcass while the end plates 8 and 9 are moving to their extended position.

An auxiliary hand valve 178 (FIG. 24) is provided in order to allow for manual actuation of the clutch arrangement 12 in the event that solenoid valve SV-1 need be manually by-passed. Similarly, a push-button switch 179 (FIG. 23) is provided in an auxiliary circuit to relay TD-1 to provide for manual energization of inflation solenoid SV-2. This allows the operator to have some degree of independent control over the air flow to the valve means 80. A transfer switch 180, having contacts 181 and 182 in the end plate drive and drum inflation circuits, is employed to shift the electrical control system from a manual to an automatic condition and vice versa. A push-button switch 183 is also provided to manually interrupt or stop the automatic operation of the machine should this become necessary.

In the discussion of the structural details, mode of operation of the machine, and the methods employed in fabricating tires, hereinbefore set forth, this invention has been described in connection with the building of a tire having a definite size relationship with the shaping drum 1. In order to use the machine and method of this invention for processing tires of different cross-sectional sizes and bead diameters the adaptor arrangements of FIGS. 21 and 22 may be employed.

FIG. 21 illustrates the use of adaptor rings 184 and 185 to process a tire having a bead diameter similar to that of the tire shown in FIG. 17; however, the cross sectional width of the tire is less than that of the FIG. 17 tire, and adaptor rings 184 and 185 are used to compensate for this difference in cross-sectional width.

FIG. 22 illustrates the use of adaptor rings 186 and 187 to process a tire having a bead diameter greater than the tire of FIG. 21, the cross-sectional width of both tires being similar.

After the stitching operation has been completed and the end plates 8 and 9 returned to their extended or limit switch LS-3 position, the shaped tire may be removed from the drum 1, given any final finishing operations that may be required, and vulcanized on air bags in molds or in presses equipped with means to expand the tire to its final form in the curing molds.

It will be apparent that a novel and efficient machine has been devised for fabricating tires of both standard and special design. The critical breaker strip assembly operation is accurately provided for by the inextensible diaphragm of the shaping drum, and relatively exact dimensional tolerances can be achieved through proper positioning of the end plates of the drum. Moreover, pneumatic stitching, with its attendant benefits in improved tire quality, is facilitated by this invention. Similarly, improved mechanical roller stitching, wherein the inflation forces are absorbed by the inextensible diaphragm rather than by the breaker, may be achieved in practicing this invention.

While particular embodiments of this invention have been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described our invention, what we claim and desire to protect by Letters Patent is:

1. A machine for use in performing tire building operations on a tire carcass, comprising: a frame; a drum rotatably supported on said frame and adapted to receive a tire carcass thereon, said drum comprising first and second spaced end plates and a generally cylindrical diaphragm means defining the peripheral surface of said drum, said diaphragm means being axially inextensible and radially expansible and being clamped at each of its ends to a different one of said first and second end plates; means for rotating said drum; means for relatively moving said end plates toward each other; means for inflating said drum to expand said diaphragm means; and stop means automatically actuated upon predetermined movement of said end plates toward each other and operative to control said end plate moving means for stopping the relative movement of said end plates with a predetermined spacing therebetween, whereby the tire carcass is expanded to and maintained at a precise predetermined diameter to facilitate application of a breaker and tread to the carcass.

2. A machine as in claim 1 and further including a restraining ring having a contoured inner surface complimentary to the outer surface of the tread portion of the carcass; means for positioning said restraining ring about the tread portion of the carcass; means for reinstituting relative movement of said end plates toward each other to decrease the spacing therebetween so that the tread portion of the carcass moves into tight contact with said restraining ring; and second stop means automatically actuated upon predetermined additional movement of said end plates toward each other and operative to control said end plate moving means for stopping the relative movement of said end plates with a second predetermined spacing therebetween, whereby the carcass and tread are compressed against the restraining ring and the tread is pneumatically stitched to the carcass.

3. A machine as in claim 2 and further including means to institute movement of said end plates away from each other; means to deflate the interior of said drum; means to introduce air under pressure to the space between the diaphragm means and the tire carcass to collapse said diaphragm means concurrently with the deflation of said drum and the relative movement away from each other of the end plates; and, third stop means automatically actuated upon predetermined movement of said end plates away from each other and operative to control said end plate moving means for stopping the relative movement of said end plates away from each other when the diaphragm means reaches a substantially cylindrical shape.

4. A machine for use in performing tire building operations on a tire carcass, comprising: a frame; cantilever shaft means rotatably supported by said frame; a drum carried by the free end of said shaft means for rotation therewith and adapted to receive a tire carcass thereon, said drum including first and second axially spaced end plates and an axially inextensible, radially expansible, inflatable cylindrical diaphragm connected at its ends to said end plates and extending therebetween; means to rotate said shaft means; means for axially, relatively moving said end plates toward each other from an intial extended position to a final retracted position and for axially, relatively moving said end plates away from each other from said retracted position to said extended position; means actuated by said end plate moving means to inflate said drum while said end plates are moving toward each other; first stop means in circuit with said end plate moving means; actuating means carried by one of said end plates and engageable with said first stop means for automatically stopping the relative movement of said end plates towards each other at a predetermined intermediate position corresponding to a predetermined diameter of the carcass to facilitate application of a restraining breaker and tread to the carcass; means for securing a restraining ring about the tread portion of the carcass; means to reinstitute relative movement of said end plates toward said retracted position to thereby initiate radially outwardly directed forces which compress the breaker, tread and carcass against said restraining ring; and second stop means in circuit with said end plate moving means, said second stop means being engaged by said actuating means when said end plates reach said retracted position for automatically stopping the relative movement of said end plates toward each other at said retracted position.

5. A machine as in claim 4 and further including means to institute movement of said end plates from said retracted position towards said extended position; means responsive to said movement of said end plates for concurrently deflating said drum and inflating the space between said diaphragm and the carcass on said drum to collapse the diaphragm; and third stop means in circuit with said end plate moving means and engageable by said actuating means for automatically stopping the movement of said end plates when they reach said extended position.

References Cited in the file of this patent

UNITED STATES PATENTS

| 1,789,143 | Kraft | Jan. 13, 1931 |
|---|---|---|
| 2,039,531 | Heston | May 5, 1936 |
| 2,084,009 | Sohl | June 15, 1937 |
| 2,717,628 | Wikle | Sept. 13, 1955 |
| 2,814,330 | Vanzo | Nov. 26, 1957 |
| 2,935,117 | Pfeifer | May 3, 1960 |
| 2,986,196 | Frazier | May 30, 1961 |

FOREIGN PATENTS

| 212,565 | Australia | June 13, 1957 |